(12) United States Patent
Boutnaru (10) Patent No.: US 10,762,192 B2
(45) Date of Patent: Sep. 1, 2020

(54) CLEARTEXT PASSWORD DETECTION USING MACHINE LEARNING

(71) Applicant: PAYPAL, INC., San Jose, CA (US)

(72) Inventor: Shlomi Boutnaru, Modiin (IL)

(73) Assignee: PAYPAL, INC., San Jose, CA (US)

(*) Notice: Subject to any disclaimer, the term of this patent is extended or adjusted under 35 U.S.C. 154(b) by 189 days.

(21) Appl. No.: 16/108,750

(22) Filed: Aug. 22, 2018

(65) Prior Publication Data

US 2020/0065476 A1 Feb. 27, 2020

(51) Int. Cl.
*G06F 40/284* (2020.01)
*G06F 16/35* (2019.01)
*G06F 21/62* (2013.01)
*G06F 21/46* (2013.01)
*G06F 16/33* (2019.01)
*G06N 20/00* (2019.01)

(52) U.S. Cl.
CPC .......... *G06F 21/46* (2013.01); *G06F 16/3347* (2019.01); *G06F 16/35* (2019.01); *G06F 40/284* (2020.01); *G06N 20/00* (2019.01)

(58) Field of Classification Search
CPC .... G06F 21/46; G06F 40/284; G06F 16/3347; G06F 16/35; G06F 21/6245; G06F 21/577; G06N 20/00
USPC .......................................................... 707/737
See application file for complete search history.

(56) References Cited

U.S. PATENT DOCUMENTS

| | | | | |
|---|---|---|---|---|
| 7,162,741 B2 * | 1/2007 | Eskin | .................. | H04L 63/1416 707/999.202 |
| 8,145,913 B1 * | 3/2012 | Zaitsev | ................. | H04L 63/083 713/183 |
| 8,312,540 B1 * | 11/2012 | Kahn | .................... | G06F 21/552 713/183 |
| 8,370,279 B1 * | 2/2013 | Lin | ........................ | G06N 20/00 706/12 |
| 8,554,703 B1 * | 10/2013 | Lin | ........................ | G06N 20/00 706/12 |

(Continued)

FOREIGN PATENT DOCUMENTS

CN 104572958 4/2015

OTHER PUBLICATIONS

Gornitz et al., "Toward Supervised Anomaly Detection", Journal of Artificial Intelligence Research, 2013, vol. 46, Issue 1, pp. 235-262. (Year: 2013).*
An IP.com Prior Art Database Technical Disclosure, "System of Detecting and Protecting Passwords Sent in Clear Text", May 10, 2011, 3 pages. (Year: 2011).*
Mahapatra et al., "Contextual Anomaly Detection in Text Data", Algorithms, 2012, vol. 5, Issue 4, pp. 469-489. (Year: 2012).*

(Continued)

*Primary Examiner* — Phuong Thao Cao
(74) *Attorney, Agent, or Firm* — Haynes and Boone, LLP (57) ABSTRACT

Cleartext passwords represent a security risk. An unencrypted password can be exploited to gain access to a system and/or perform unauthorized functions. This disclosure describes how to detect cleartext passwords in a generalized manner using predictive text classifiers (e.g. Word2Vec). Using a corpus of text, an artificial intelligence model can be built by training a predictive text classifier to identify password anomalies (e.g., areas of text that occur with low statistical probability). Source program code, configuration files, log files, and other types of text can be automatically scanned for cleartext passwords without having to rely on password lists or other limited and/or labor intensive mechanisms, thus improving system security and reducing the chances of data exfiltration and unauthorized actions.

20 Claims, 4 Drawing Sheets

(56) References Cited

U.S. PATENT DOCUMENTS

| | | | | |
|---|---|---|---|---|
| 8,762,299 | B1* | 6/2014 | Breckenridge | G06K 9/6227 706/12 |
| 9,407,652 | B1* | 8/2016 | Kesin | G06N 7/005 |
| 9,537,888 | B1* | 1/2017 | McClintock | H04L 63/145 |
| 2003/0126248 | A1* | 7/2003 | Chambers | H04L 41/0886 709/223 |
| 2005/0193429 | A1* | 9/2005 | Demopoulos | H04L 63/1408 726/23 |
| 2007/0083374 | A1* | 4/2007 | Bates | G10L 15/197 704/257 |
| 2010/0083369 | A1 | 4/2010 | Shmuylovich et al. | |
| 2011/0041166 | A1 | 2/2011 | Mani | |
| 2011/0131418 | A1 | 6/2011 | Teng et al. | |
| 2012/0191630 | A1* | 7/2012 | Breckenridge | G06N 20/00 706/12 |
| 2015/0347383 | A1 | 12/2015 | Willmore et al. | |
| 2017/0193108 | A1* | 7/2017 | Gandhi | H04L 67/02 |
| 2018/0278554 | A1* | 9/2018 | Kassabgi | G16H 10/20 |
| 2020/0036739 | A1* | 1/2020 | Novikov | G06F 21/554 |
| 2020/0106792 | A1* | 4/2020 | Louie | G06N 20/00 |

OTHER PUBLICATIONS

Sanchez et al., "Detecting Sensitive Information from Textual Documents: An Information-Theoretic Approach", Nov. 2012, 13 pages [online], [retrieved on Oct. 22, 2019]. Retrieved from the Internet <URL:https://www.researchgate.net/publication/235946578_Detecting_Sensitive_Information_from_Textual_Documents_An_Information-Theoretic_Approach>.

SANS Institute InfoSec Reading Room, "Clear Text Password Risk Assessment Documentation", SANS Institute 2002, (10 pages).

Vibha Singhal, Diptikalyan Saha, Pankaj Dhoolia, Rohan Padhye, Senthil Mani, "Detecting and Mitigating Secret-Key Leaks in Source Code Repositories", IBM Research {vibha.sinha, diptsaha, pdhoolia, sentmani] @in.ibm.com (5 pages).

Paul Brandau, "Navigating Clear Text Password Vulnerabilities" in Information Security (https://deltarisk.com/blog/category/information-security/); (9 pages). Retrieved online <https://deltarisk.com/blog/navigating-clear-text-password-vulnerabilities/>.

Karthik Thotta Ganesh, "Getting Secrets out of Source Code", posted May 25, 2017; (4 pages). Adobe Systems Incorporated; Retrieved online <https://blogs.adobe.com/security/2017/05/getting-secrets-out-of-source-code.html>.

* cited by examiner

CLEARTEXT PASSWORD DETECTION USING MACHINE LEARNING

TECHNICAL FIELD

This disclosure relates, in various embodiments, to advanced techniques for locating passwords stored in cleartext (i.e. unencrypted passwords) and/or passwords stored in undesirable locations.

BACKGROUND

Passwords are a widely used computer security measure, and may be required for a user to log into a system, access a database, verify identity, etc. In some instances, passwords may be stored unencrypted in cleartext, which can cause numerous security problems. Within application source code, for example, a programmer might hard-code access code credentials for an enterprise database. Someone who disassembles the source code (or otherwise obtains it) would then be able to gain access to these credentials. Efforts to prevent the use of cleartext passwords are not always effective, may be labor intensive, and do not provide a robust generalized solution that can be used in a variety of contexts.

DETAILED DESCRIPTION

Cleartext passwords are undesirable for a number of reasons. Their presence within a system can lead to security breaches at a higher rate, and such breaches may result in data theft, unauthorized transactions, information technology and/or infrastructure damage, and other negative effects.

Nonetheless, cleartext passwords may still occur in a variety of situations. Detecting such passwords can therefore improve computer system security. Cleartext passwords may be present in programming source code (e.g. script code and/or code that is compiled into an executable). They may also be present in configuration files (for an application, database, and/or service, for example), or in log files. Cleartext passwords may even be present in other information sources, such as an internal (corporate) web page or Wiki. All of these environments represent potential security hazards.

One approach for detecting cleartext passwords involves scanning text and comparing the text against a list of known and/or common passwords. If a piece of source code has the characters "Password123" in it, for example, this may represent a cleartext password. This approach of using known passwords, however, fails to provide a generalized solution. Users may have passwords that do not appear on a known password list, and thus would fail to be detected by this approach. If a lengthy and complex cleartext password of "9-3847tSFD_$%ASFsf3kfg!zcn" was used, for example, a scanning approach based on known passwords would likely fail. Nonetheless, such cleartext passwords still represent a security risk.

This disclosure includes generalized techniques that can allow cleartext passwords to be detected regardless of their similarity to other known pre-existing passwords, in various embodiments. At a general level, this detection approach may include (1) using a corpus of text to train a predictive text classifier; (2) executing the predictive text classifier against an uncategorized text file; and (3) determining, based on probability information produced using the predictive text classifier, whether one or more password anomalies exist in the uncategorized text.

More specifically, a predictive text classifier can be trained such that given a first sequence of characters, prediction odds can be generated for one or more characters that follow. The phrase "Sally started the ______" for example, might be followed by "car" (25%), "oven" (5%), "dishwasher" (3%), or other (67%). (This simple example is simply intended to illustrate how certain words are more likely, or less likely, to follow certain other words or phrases.)

A key insight here, however, is that passwords are often quite unusual relative to their neighboring text, and often rather unique in their spelling. The odds of a specific password appearing within a block of given text may be quite low, as determined by a predictive text classifier. E.g., the predictive text classifier may be able to determine that the phrase "9-3847tSFD_$%ASFsf3kfg!zcn" has only a 0.0003% chance of appearing at a location in a text file (that is, based on an analysis, this sequence of characters is believed to only have a 0.0003% chance of occurring at the particular spot in the text at which it appears). Because passwords may have an extremely low probability of appearance within a body of text, a password anomaly alert can be generated when low probability sequences are discovered. The password anomaly alert can inform a user of a possible cleartext password, and provide additional location and/or contextual information about the password anomaly. A threshold probability may be used to determine if a password anomaly is present—that is, if a sequence of characters is below a particular probability threshold, then a password anomaly may be inferred. Note that the term "password anomaly" refers to a possible (e.g. suspected) cleartext password, in various embodiments.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
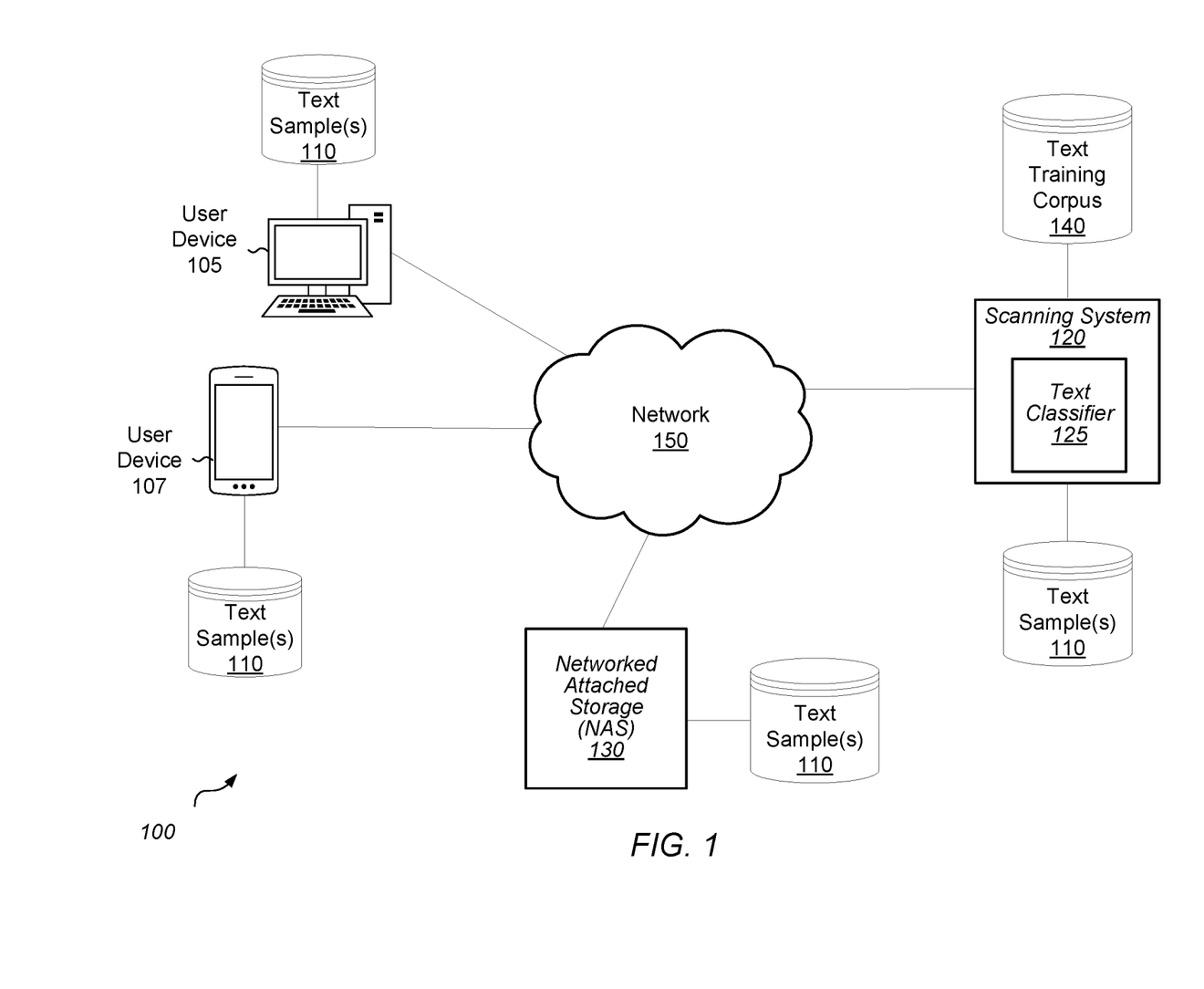
FIG. 1 illustrates a block diagram of a system, according to some embodiments.

Turning to FIG. 1, a block diagram of a system 100 is shown. In this diagram, system 100 includes a scanning system 120, user devices 105 and 107, a networked attached storage (NAS) 130, and a network 150. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

Scanning system 120 may perform various operations related to detecting cleartext passwords. As shown, scanning system includes a text classifier 125 that can be trained on text training corpus 140. Text training corpus 140 may contain a number of different text samples, such as programming code or other text. In some embodiments, text training corpus 140 preferably contains few or none passwords inside it, as inclusion of passwords could potentially affect accuracy of cleartext password detection (e.g. it may be advantageous to train text classifier 125 on data without cleartext passwords, although it can still operate even if there are such passwords present in text training corpus 140).

User devices 105 and 107, along with NAS 130, are intended to illustrate that cleartext password detection can be performed in a variety of devices and environments. Text sample(s) 110 includes one or more text samples that are uncategorized—e.g., have not been evaluated yet to see whether or not they are believed to contain cleartext passwords. Thus, user devices 105 and 107 may have text sample(s) 110 that are stored on those devices or are otherwise accessible, as may NAS 130. Scanning system 120 may thus operate on locally accessible text samples and/or remote text samples to detect cleartext passwords, in various embodiments.

Figure 2:
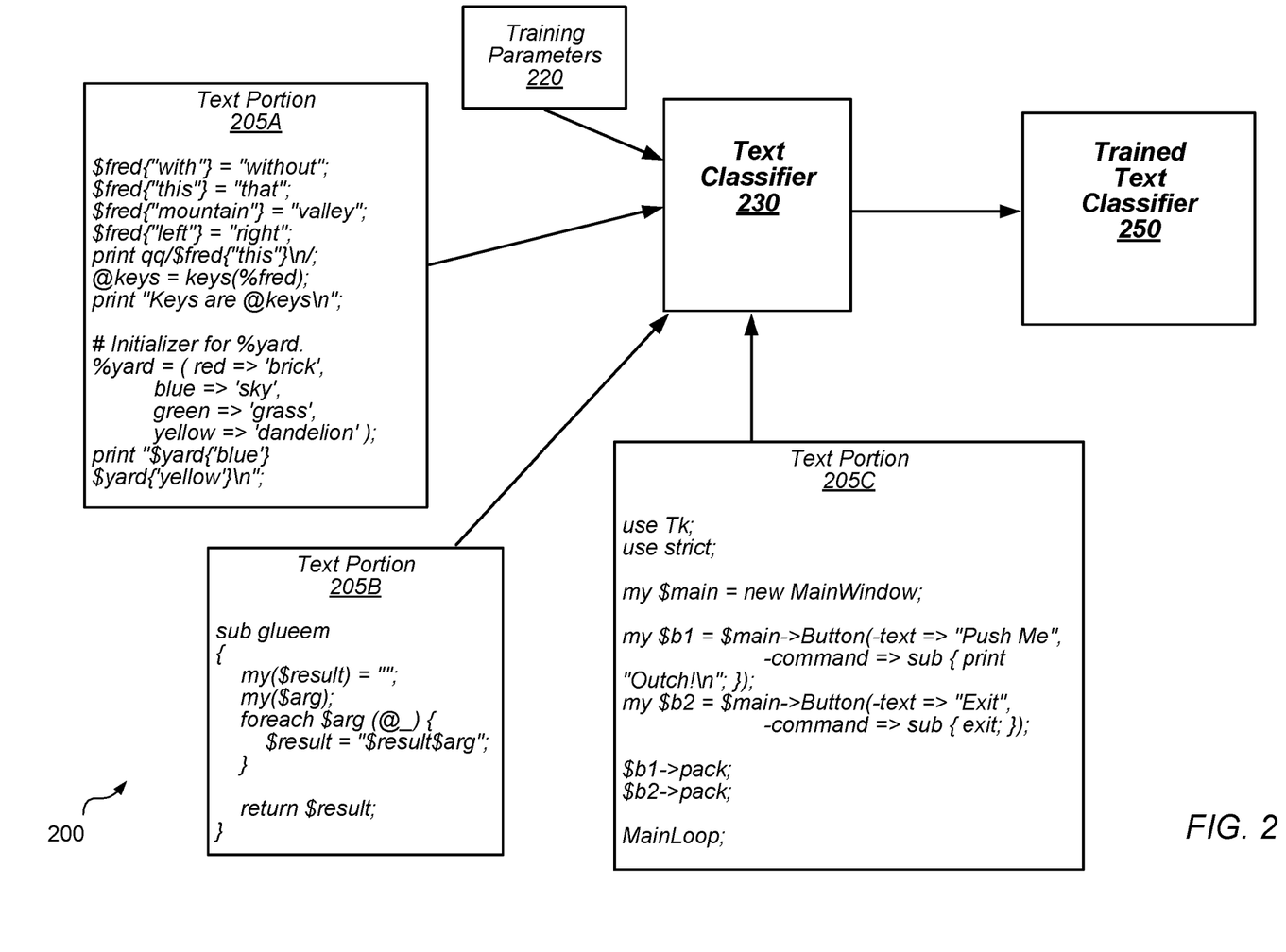
FIG. 2 illustrates an information flow diagram, according to some embodiments.

Turning to FIG. 2, an information flow diagram 200 is shown, according to some embodiments, relating to operations that produce a trained text classifier. In this figure, text portions 205A, 205B, and 205C are provided to a text classifier 230, along with training parameters 220. Text classifier 230 may be any text classifier capable of making a prediction (after training into trained text classifier 250) about the likelihood of a sequence of characters appearing within a text sample, in various embodiments, and may be implemented as stored computer-executable instructions. E.g., trained text classifier 250 may be fed the sequence of input "The quick brown fox jumped over the lazy ______", and then try to predict the likelihood of the next character sequence.

Conversely, trained text classifier 250 can also do what amounts to a backwards classification, and predict the likelihood (or unlikelihood) or particular characters that appear in a particular location. Thus, for the example above, trained text classifier 250 might predict "dog" as the next character sequence after "the quick brown fox jumped over the lazy ______" (60% likelihood). However, trained text classifier 250 may also be able to evaluate "the quick brown fox jumped over the lazy igloo", and determine that the character sequence "igloo" has only a 0.3% general likelihood of appearing in that sentence. Thus, trained text classifier 250 can predict how common (or uncommon) a particular character sequence is, based on the corpus of text with which the classifier was trained.

The text portions in this example (205A, 205B, and 205C) are Perl programming code, but may of course vary by embodiment. The text portions provided to text classifier 230 (as part of a text corpus) may all be of the same type—e.g., code portions may all be in a same programming language such as C++ or JAVA, and text may all be in a same written language (e.g. English, Spanish, French, Mandarin, etc.).

Training parameters 220 may also be provided to text classifier 230 as part of the process of creating trained text classifier 250. These parameters may provide additional information that is used when processing a corpus of text. For example, training parameters 220 may specify character tokenization information. For certain kinds of source code, characters such as the semi-colon [;], colon [:]; dollar sign [$], plus sign [+], or minus sign [−] might be ignored when found present in source text. Likewise, code comment information could optionally be stripped out as well (e.g., the training parameters 220 might specify that all text located between a '/**' character sequence and a '*/' character sequence be stripped out for C++ code). Thus, certain de-limiting characters may be specified as part of training parameters 220 in some embodiments. These delimiting characters (e.g. quotation mark ["]) may be used in password anomaly analysis by using them as a start and a stop for a sequence of characters to be analyzed for likelihood of appearance (e.g., analyze everything between two quotation marks to determine its likelihood of appearance).

Figure 3:
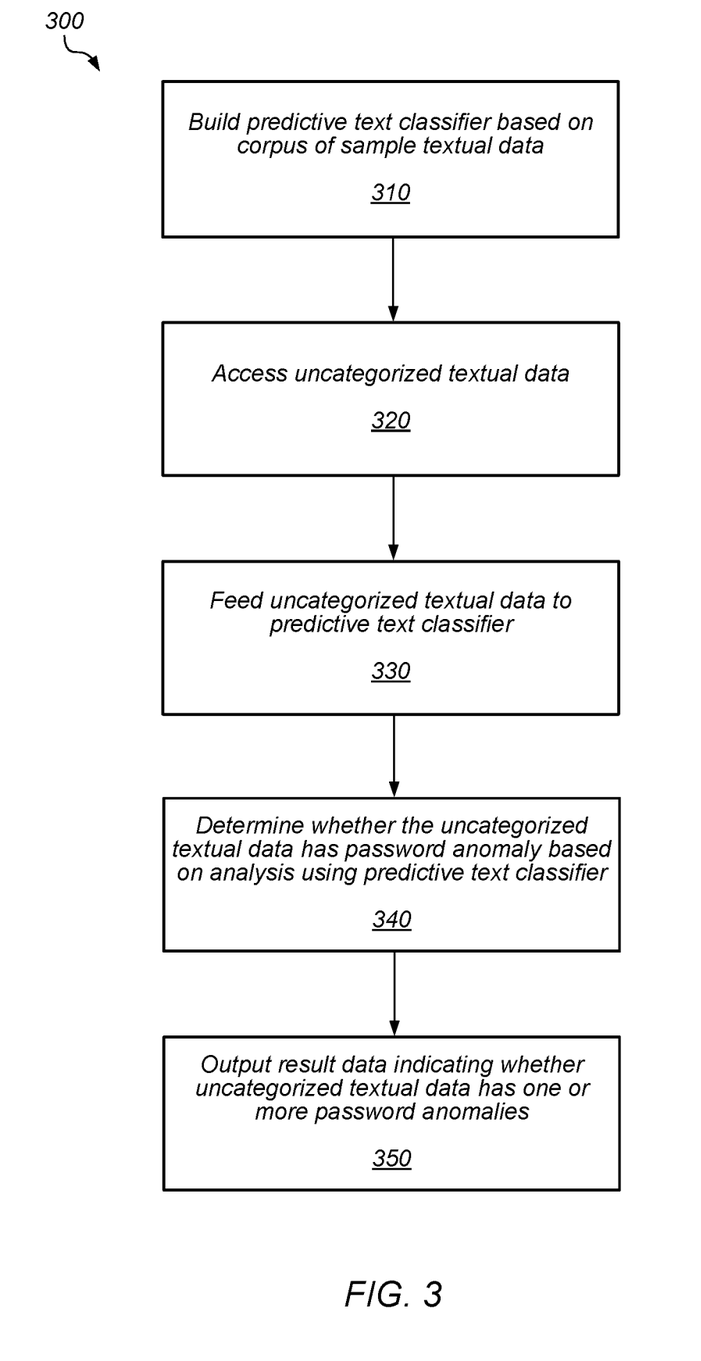
FIG. 3 illustrates a flow diagram of a method, according to some embodiments.

Turning to FIG. 3, a flowchart is shown of one embodiment of a method 300 relating to using a predictive text classifier to detect possible cleartext passwords (e.g. password anomalies).

Operations described relative to FIG. 3 may be performed, in various embodiments, by any suitable computer system and/or combination of computer systems, including scanning system 120. For convenience and ease of explanation, operations described below will simply be discussed relative to scanning system 120 rather than another system, however. Further, various elements of operations discussed below may be modified, omitted, and/or used in a different manner or different order than that indicated. Thus, in some embodiments, scanning system 120 may perform one or more aspects described below, while another system might perform one or more other aspects.

In operation 310, scanning system 120 builds a predictive text classifier based on a corpus of sample textual data, according to various embodiments. Building the predictive text classifier may comprise training a predictive text classifier such as Word2Vec using a corpus of training text. The training text may be specially selected, pre-screened, or otherwise pre-processed. E.g., training text that is believed to contain no cleartext passwords (or believed to have a low incidence of such passwords) may be used. Comments, de-limiting characters, and/or other data may be stripped out of programming source code, in some embodiments, prior to providing the training text to the predictive text classifier. Parameter information may be supplied to a text classifier along with the training text in operation 310.

In some embodiments, multiple different predictive text classifiers may be built based on different text corpuses. This may be desirable in order to better identify password anomalies in different kinds of source text. For example, a first predictive text classifier might be built using a text corpus of C++ code, while a second predictive text classifier might be built using a text corpus of JAVA code. One predictive text classifier might be based on English language source text, while another predictive text classifier is based on Hebrew language source text. Predictive text classifiers may also be built on text corpuses that have mixed kinds of source text (e.g. a hybrid predictive text classifier might be trained for both C source code and C++ source code, or trained for Perl source code featuring German language comments and/or variable names, as well as Perl source code featuring Dutch language comments and/or variable names). Many different permutations for a predictive text classifier are possible.

In operation 320, scanning system 120 accesses uncategorized textual data, according to various embodiments. This operation may include accessing local or remote data that contains text.

In some instances, accessing uncategorized textual data in operation 320 may include automatically recognizing certain types of text among other data. For example, a particular file may contain some text that is in a first programming language, and other text that is not in that programming language. The file could be scanned to identify (e.g. based on delimiting characters, certain function headings or names like "public static void main" in JAVA) the portions of the file that are of the particular text type, and separate those portions from other data within a file. Thus, for a specific source of text data, certain portions may be analyzed (and used for classifier training purposes) while other portions might be ignored (or assessed with a different trained text classifier).

Based on automatic recognition of textual data type, a particular predictive text classifier, from several different classifiers, may be selected for use in cleartext password detection. Text data may have one or more particular attributes associated with it, such as a particular written language, particular programming language, etc. Based on these attributes, the best matching trained predictive text classifier can be selected from a group of classifiers. E.g., a text portion determined to contain Perl scripting language can have a classifier selected that was trained using a corpus of Perl code.

In some embodiments, operation 320 may include de-compressing data (e.g. unzipping), decrypting data, or taking another action to make uncategorized text readable by scanning system 120. Operation 320 can also include separating a particular data source (e.g. a specific file, a particular entry within a database, etc.) into two or more text portions with particular attributes. Thus, a single file that contains different types of text can be analyzed using two or more different predictive text classifiers to determine if password anomalies are present.

In operation 330, scanning system 120 feeds the uncategorized textual data to the predictive text classifier, according to various embodiments. This step includes providing text data—which may or may not contain password anomalies—to a trained predictive text classifier. Scanning system 120 may format the uncategorized textual data or process it in any manner to place it in a proper input format for the classifier.

In operation 340, scanning system 120 determines whether the uncategorized textual data has one or more password anomalies based on analysis using the predictive text classifier, e.g., using an initial group of one or more characters of the uncategorized textual data to predict a subsequent group of one or more characters that follow the initial group, according to various embodiments. This determination may be made by the predictive text classifier, or another program, according to some embodiments.

Operation 340 thus includes predicting the likelihood that a particular character string would appear in a particular spot inside a text document, in some embodiments. Text documents tend to have certain similarities, and a cleartext password will generally not share those similarities, since cleartext passwords are frequently odd-looking and unusual in the context of other surrounding character sequences.

A human reader with skill in English will readily understand that there is an obvious anomaly in the sequence:

"The quick brown fox rt43gem^20frog jumped over the lazy dog"

with the anomaly in this case being the sub-sequence "rt43gem^20frog". This sub-sequence is quite plainly not an ordinary English word. It contains two small words ("gem" and "frog") but is also concatenated together with other characters that have no apparent ordinary meaning.

In short, the sub-sequence "rt43gem^20frog" looks like it could be a password. But instead of having a human subjectively determine whether something "looks like" a password, the present disclosure uses predictive techniques to achieve a statistical level of certainty. A trained predictive text classifier, for example, can analyze the likelihood of appearance of a character sequence within the context of one or more preceding characters and/or one or more subsequent characters.

A text classifier may look at a variety of factors when making a determination of likelihood. E.g., what character sequences tend to follow the word "fox"? More broadly, what character sequences follow a three letter word ending in "x", a three letter word with "o" as the middle letter, a three letter word ending in "ox", or a three letter word beginning with "fo"? What about words of any length that end with "x", or words of any length that begin with "f"? Likewise, when looking at other characters: what character sequences tend to precede the word "jumped"? Or more broadly, what character sequences tend to precede a six-letter word ending in "ed"? Generally, a trained predictive text classifier, such as a Word2Vec classifier, can build a feature space using a text corpus, and compare uncategorized text characters to this feature space. The dimensionality of the feature space may be specified by parameters supplied during the training process.

Further, a character sequence itself may be internally analyzed to determine its likelihood of appearance. In the case of the sequence "rt43gem^20frog", various individual sub-sequences may be analyzed relative to other sub-sequences. Looking at 1-tuples, for example, how often is a first character of "r" followed by a second character of "t"? How often does a first character of "r" appear at all in a sequence?

Continuing the above example, how often is a second character of "t" followed by a third character of "4"? How often does a second character of "t" appear at all? Looking at 2-tuples, how often does "rt" appear as a first two characters in sequence? How often is "rt" followed by "43"? As will be appreciated, this process can be repeated in many iterations as various bits of a character sequence are examined relative to one another.

Thus, multiple different character sequences may be analyzed to determine if password anomalies exist,. In some cases, each sequence of characters may be analyzed to determine its likelihood of occurrence by a predictive text classifier that has been trained on a corpus. This can involve, for example, independently analyzing every character sequence between two different delimiting characters. In the case of typical English prose, delimiting characters might be typical punctuation characters (like comma, semi-colon, colon, quotation mark, etc.) as well as the space character [ ] and/or underscore character [_]. Other delimiting characters may be used for other types of source text.

In one instance, source text is tokenized according to a tokenization scheme. In the case of programming source code, only text within hard-coded strings may be analyzed, according to one tokenization scheme. E.g., the only text that is analyzed to see if it is a cleartext password may be text that is within single or double quotation marks ([''] or ["]). This is because it may be unlikely or impossible for a cleartext password to be otherwise stored within the formal programming language of the code (e.g. a variable name is unlikely to be a cleartext password, but a string value may be). When analyzing a hard-coded string, however, portions of text outside the string may be still be assessed for predictive ability. That is, the tendency of particular characters within the hard-coded string to appear before or after characters outside of the hard-coded string can still be assessed in determining whether the string has a password anomaly. Further, the string may be sub-divided into different portions (e.g. character segments of four or more characters, and/or character segments divided by whitespace or another delimiting character) with each of those portions analyzed. The string "FredSmith; Longhorns2018" could be separately assessed for password anomalies by analyzing two different sub-sequences, for example ('FredSmith' and 'Longhorns2018').

By performing analyses as those illustrated above, a predictive text classifier can be used to get a prediction of the likelihood of a particular character sequence appearing in a text sample. When this likelihood is sufficiently low (e.g. below a threshold), a password anomaly is detected, in various embodiments. In some instances, a target sequence of characters (e.g. 'Longhorns2018') may be assessed by reviewing immediately preceding characters and/or immediately following characters. Those assessments may include characters that are also part of a hard-coded string, or characters that fall outside of a hard-coded string. Characters may also be skipped—e.g. the likelihood of appearance of 'Longhorns2018' could be analyzed with respect to the $5^{th}$ through $18^{th}$ characters that follow this sequence, for example, or the $10^{th}$ through $2^{nd}$ characters that precede this sequence in the original text sample.

The above approach can be generalized by using different predictive text classifiers for different text types. Certain characters and/or character sequences might be anomalous within certain contexts, but not within other contexts. Thus, within a sample of SQL query code for example, certain sequences are more or less likely than within a sample of English prose or JAVA code. When a particularly unlikely sequence is found within a text sample, it can be identified as a password anomaly. E.g., if a sequence is below some threshold level, such as 1% probability, 0.1% probability, 0.002% probability, or some other number. (This threshold number can be adjusted lower to avoid false positives at the expense of potentially missing some password anomalies.)

By reviewing multiple different character sequences in an uncategorized text document, a generalized map of the text can be produced. This map, for example, may specify locations within the text (e.g. line number, character numbers, paragraph numbers, location within a specific programming code function, or other identifying information) where a password anomaly is believed to exist.

Accordingly, in operation 350, scanning system 120 outputs result data indicating whether the uncategorized textual data was determined to have one or more password anomalies, according to various embodiments. This output data may take various formats, but may generally indicate information such as (1) existence and/or total number of detected cleartext password anomalies (2) location of password anomalies within the textual data; and (3) additional contextual information (e.g. highlighting the password anomaly; excerpting the anomaly from the text for ease of review and providing it in a separate reporting document, for example by copying the anomaly along with a limited amount of surrounding text such as a certain number of words or lines above, below, and including the anomaly).

Computer-Readable Medium

Figure 4:
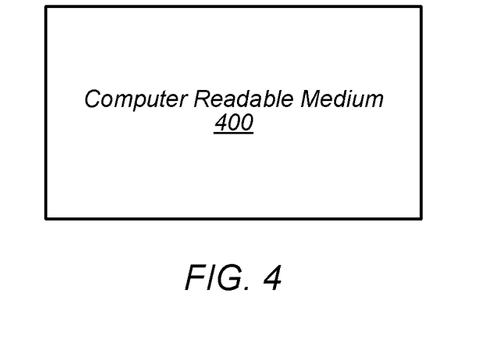
FIG. 4 is a diagram of a computer readable medium, according to some embodiments.

Turning to FIG. 4 a block diagram of one embodiment of a computer-readable medium 400 is shown. This computer-readable medium may store instructions corresponding to the operations of FIG. 3 and/or any techniques described herein. Thus, in one embodiment, instructions corresponding to scanning system 120 may be stored on computer-readable medium 400.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 5:
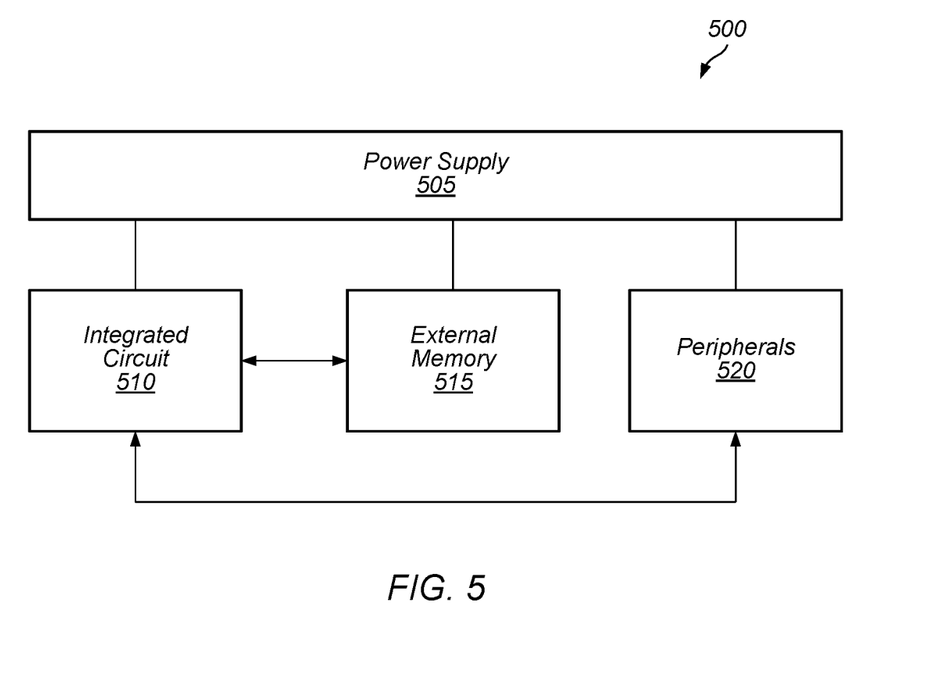
FIG. 5 is a block diagram of a system, according to some embodiments.

In FIG. 5, one embodiment of a computer system 500 is illustrated. Various embodiments of this system may be included in scanning system 120, or any other computer system.

In the illustrated embodiment, system 500 includes at least one instance of an integrated circuit (processor) 510 coupled to an external memory 515. The external memory 515 may form a main memory subsystem in one embodiment. The integrated circuit 510 is coupled to one or more peripherals 520 and the external memory 515. A power supply 505 is also provided which supplies one or more supply voltages to the integrated circuit 510 as well as one or more supply voltages to the memory 515 and/or the peripherals 520. In some embodiments, more than one instance of the integrated circuit 510 may be included (and more than one external memory 515 may be included as well).

The memory 515 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 510 in a chip-on-chip configuration, a package-on-package configuration, or a multi-chip module configuration.

The peripherals 520 may include any desired circuitry, depending on the type of system 500. For example, in one embodiment, the system 500 may be a mobile device (e.g.

personal digital assistant (PDA), smart phone, etc.) and the peripherals 520 may include devices for various types of wireless communication, such as wifi, Bluetooth, cellular, global positioning system, etc. Peripherals 520 may include one or more network access cards. The peripherals 520 may also include additional storage, including RAM storage, solid state storage, or disk storage. The peripherals 520 may include user interface devices such as a display screen, including touch display screens or multitouch display screens, keyboard or other input devices, microphones, speakers, etc. In other embodiments, the system 500 may be any type of computing system (e.g. desktop personal computer, server, laptop, workstation, net top etc.). Peripherals 520 may thus include any networking or communication devices. By way of further explanation, in some embodiments system 500 may include multiple computers or computing nodes that are configured to communicate together (e.g. computing cluster, server pool, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    a computer system accessing uncategorized textual data;
    the computer system feeding the uncategorized textual data to a predictive text classifier, the predictive text classifier built using a corpus of sample textual data;
    determining, at the computer system by the predictive text classifier, whether the uncategorized textual data has one or more password anomalies based on the predictive text classifier using an initial group of one or more characters of the uncategorized textual data to predict a subsequent group of one or more characters that follow the initial group; and
    outputting, by the computer system, result data indicating whether the uncategorized textual data was determined to have one or more password anomalies.

2. The method of claim 1, wherein determining whether the uncategorized textual data has one or more password anomalies comprises:
    determining a predictive probability, based on the predictive text classifier, of the subsequent group of characters following the initial group of characters; and
    determining that a password anomaly exists if the predictive probability is below a particular threshold probability.

3. The method of claim 1, wherein the subsequent group of characters immediately follow the initial group of characters.

4. The method of claim 1, wherein the corpus of sample textual data comprises a plurality of files including text data that are of a same type, and wherein the uncategorized textual data is of the same type.

5. The method of claim 4, wherein the corpus of sample textual data includes programming source code in a particular language, and wherein the uncategorized textual data also includes programming source code in the particular language.

6. The method of claim 1, wherein the operations further comprise:
    identifying, within the uncategorized textual data, one or more locations within the uncategorized textual data at which one or more password anomalies are present; and
    providing location information indicating the one or more locations.

7. The method of claim 1, further comprising:
    automatically determining, by the computer system, whether the uncategorized textual data contains textual data of a same type as textual data in the corpus.

8. The method of claim 1, wherein the predictive text classifier is a Word2Vec classifier.

9. The method of claim 1, wherein the subsequent group of characters comprises at least four characters.

10. The method of claim 1, wherein accessing the uncategorized textual data comprises accessing a file and extracting the uncategorized textual data from one or more first portions of the file, while not extracting data from one or more other portions of the file.

11. A non-transitory computer-readable medium having stored thereon instructions that are executable by a computer system to cause the computer system to perform operations comprising:
    accessing uncategorized textual data;
    feeding the uncategorized textual data to a predictive text classifier, the predictive text classifier built using a corpus of sample textual data;
    determining whether the uncategorized textual data has one or more password anomalies based on the predictive text classifier using an initial group of one or more characters of the uncategorized textual data to predict a subsequent group of one or more characters that follow the initial group; and
    outputting result data indicating whether the uncategorized textual data was determined to have one or more password anomalies.

12. The non-transitory computer-readable medium of claim 11, wherein the operations further comprise:
    tokenizing the uncategorized textual data, based on one or more provided parameters, to produce a plurality of tokenized character sequences.

13. The non-transitory computer-readable medium of claim 12, wherein the predictive text classifier analyzes each of the plurality of tokenized character sequences to determine whether that tokenized character sequence includes a password anomaly.

14. The non-transitory computer-readable medium of claim 11, wherein the operations further comprise:
    identifying, within the uncategorized textual data, one or more locations within the uncategorized textual data at which one or more password anomalies are present; and providing location information indicating the one or more locations.

15. The non-transitory computer-readable medium of claim 11, wherein the operations further comprise:
determining whether the uncategorized textual data has one or more password anomalies based on the predictive text classifier using a further subsequent group of one or more characters of the uncategorized textual data to predict the subsequent group of one or more characters that follow the initial group.

16. The non-transitory computer-readable medium of claim 15, wherein the further subsequent group of characters do not immediately follow the subsequent group of characters.

17. A computer system, comprising:
a processor;
a display; and
a non-transitory computer-readable medium having stored thereon instructions that are executable by the processor to cause the computer system to perform operations comprising:
accessing uncategorized textual data;
feeding the uncategorized textual data to a predictive text classifier, the predictive text classifier built using a corpus of sample textual data;
determining whether the uncategorized textual data has one or more password anomalies based on the predictive text classifier using an initial group of one or more characters of the uncategorized textual data to predict a subsequent group of one or more characters that follow the initial group; and
outputting result data indicating whether the uncategorized textual data was determined to have one or more password anomalies.

18. The computer system of claim 17, wherein the operations further comprise:
determining a predictive probability, based on the predictive text classifier, of the subsequent group of characters following the initial group of characters; and
determining that a password anomaly exists if the predictive probability is below a particular threshold probability.

19. The computer system of claim 17, wherein the corpus of sample textual data comprises a plurality of files including text data that are of a same type, and wherein the uncategorized textual data is of the same type.

20. The computer system of claim 17, wherein the operations further comprise:
identifying, within the uncategorized textual data, one or more locations within the uncategorized textual data at which one or more password anomalies are present; and
providing location information indicating the one or more locations.

\* \* \* \* \*